United States Patent Office 2,849,200
Patented Aug. 26, 1958

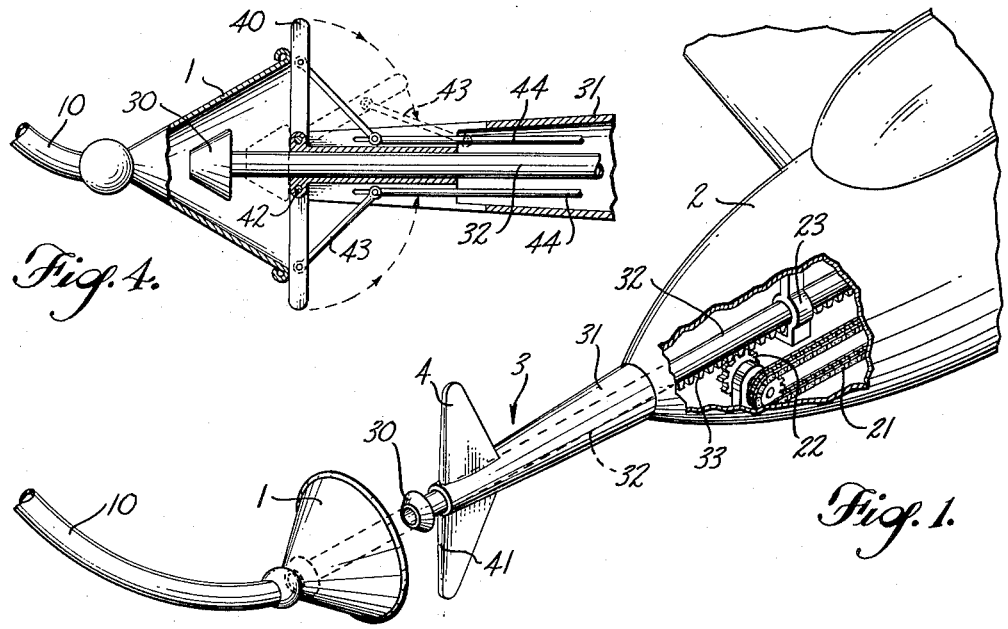
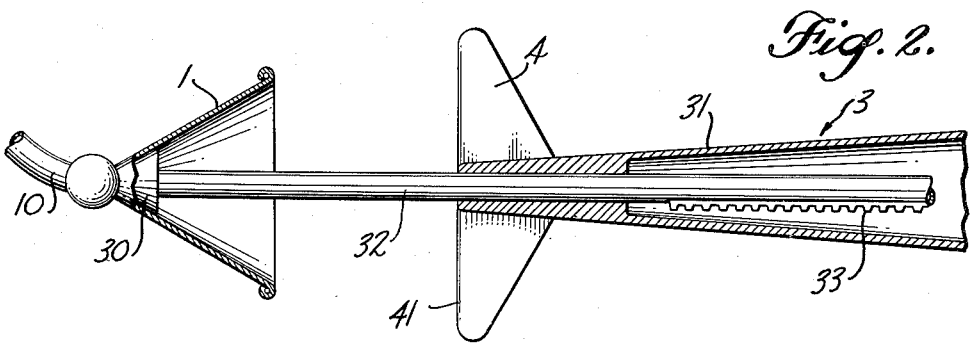
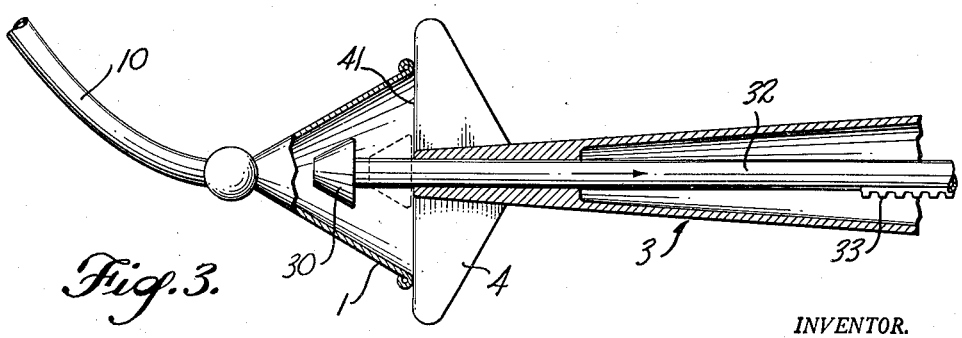

2,849,200

PROBE-DROGUE REFUELING MEANS

Robert P. Person, Seattle, Wash., assignor to Boeing Airplane Company, Seattle, Wash., a corporation of Delaware Application April 15, 1954, Serial No. 423,442

4 Claims. (Cl. 244—135)

A common method of refueling airplanes in flight consists in trailing a hollow conical drogue, at the end of a refueling hose depending from the tanker airplane, until the receiving airplane, having a forwardly projecting probe, projects that probe through the hollow base of the conical drogue, until the probe's tip seats at the apex of the drogue, thereby establishing contact with the end of the hose. The drogue is held thus seated by the relative airstream. Refueling then commences, the fuel passing to the receiving airplane through the probe.

Refueling by the probe-drogue method is especially advantageous where it is not possible, or at least not readily feasible, for the receiving airplane and the tanker airplane to maintain substantially identical speeds and flight paths over the period of time required for refueling. By reason of the fact that the drogue is at the end of a flexible hose trailing behind the tanker airplane, and the further fact that the relative airstream tends to hold the drogue to its seat upon the tip of the probe, the receiving airplane may overtake the tanker airplane to a degree, or may fall back, or waver in elevation or course, with relation to the tanker airplane, yet all the time the drogue is retained properly seated upon the probe.

This virtue of the probe-drogue system likewise entails certain disadvantages when the refueling is completed and it is desired to break off contact. This is normally accomplished by the tanker airplane speeding up and pulling away from the receiving airplane, or by the latter dropping back, thus forcibly breaking the seating of the drogue upon the tip of the probe. Normally this can be done satisfactorily, but it always imparts a strain to the mechanism, and particularly to the hose and its fittings, and there have been occasions where the connection could not be broken. Indeed, there was a recent occasion when a tanker airplane thus made contact with a receiving airplane, and finding it impossible, by reason of some defect, to transfer fuel to the receiving airplane, nevertheless through the draft connection thus established towed the nearly fuel-less airplane for an appreciable distance until it could make a satisfactory landing.

It is the principal object of the present invention to provide means in connection with such a probe-drouge refueling system, by the use of which the breaking of contact can be positively assured by the receiving airplane.

It is, of course, an object to provide means to the end indicated, which shall be simple in construction and operation, and which will add but little to the weight and drag of the receiving airplane.

This invention comprises the novel probe construction on the receiving airplane, and the novel combination and relationship between a drogue and a probe of this type, as shown in an illustrative and typical form in the accompanying drawings, and as will be more fully explained hereinafter and defined in the claims.

Figure 1 is an isometric view of the probe of a receiving airplane, and of the refueling hose and drogue of a tanker airplane, showing the two about to make refueling contact; part of the skin and structure of the receiving airplane has been broken away to show a possible operating mechanism for the probe.

Figure 2 is an axial sectional view of the drogue and probe while in refueling contact, and Figure 3 is a similar view showing the manner of breaking the contact between the two.

Figure 4 is a view similar to Figure 3, showing a modified form of the contact-breaking means.

This invention, in broad outline, comprises the usual probe on the receiving airplane and the usual drogue at the end of a flexible hose which trails behind the tanker airplane, together with a disengaging means associated with the probe, relative movement between which probe and disengaging means, in a fore and aft direction, is capable of accomplishment under control of the receiving airplane's pilot or crew member. This movement either holds the drogue while the probe is withdrawn from it rearwardly, or, less desirably, may force the drogue forwardly off the probe. The disengaging means may remain in the airstream at all times, being in a location and of a formation such that it but slightly, if at all, increases the drag, impairs the handling characteristics, or obstructs the vision of the pilot, of the receiving airplane, or else it may be capable of complete retraction when not in use.

The tanker airplane is not shown in the drawings, but there is shown a refueling hose 10 having at its end a hollow, conical, rearwardly facing drogue 1, which is acted upon by the relative airstream to pull the refueling hose 1 rearwardly. The receiving airplane is indicated generally at 2, and is provided with a probe, indicated generally by the numeral 3, which projects forwardly from the airplane 2. According to this invention the probe, instead of being of one piece, is made of two members, namely, a fixed outer member 31 and a tubular inner member 32 which is projectable forwardly and retractable rearwardly, until when retracted it is substantially wholly within the fixed member 31. The projectable and retractable member 32 is suitably guided in the airplane and in the fixed probe member 31, a guide 23 being illustrated for the purpose, in addition to the guide at the forward end of the member 31. Also, any suitable means are provided for effecting the projection and retraction positively of the probe member 32, these means being suggested by the rack 33 on the member 32, the pinion 22 meshing with the rack, and the means such as the chain 21 for effecting rotation of the pinion 22 from a distant point, or through any suitable control.

The forward tip of the projectable and retractable probe member 32 is suitably formed to fit and seat fluid-tightly within the apex of the drogue 1. A tip 30, of suitable shape and material, has been illustrated. It is not essential that this seat 30 be retractable within the fixed probe member 31, and the retraction of the probe member 32, while substantially complete, may leave the seating member 30 outside and just forward of the forward tip of the fixed probe member 31.

The extent of projection of the inner probe member 32 with relation to the fixed probe member 31 is sufficient that the seat 30 will be well ahead of the forward tip of the fixed member 31, in such a position as is shown in Figure 2, or in dash lines in Figure 1. Thus projected forwardly the seat 30 fits within the drogue 1, centers the drogue, and the relative airstream holds the drogue on the seat 30 in the same manner as it has in the past been held to the forward tip of a fixed probe. When refueling is completed, however, the receiving airplane 2 retracts its probe member 32. This in itself will not break contact between the probe and the drogue, but I provide, in the vicinity of the retracted position of the seat 30, that is to say, in the vicinity of the forward tip of the fixed probe member 31, a stop element 4. This may take various forms, but is conveniently in the form of a vane fixedly disposed generally in a plane through the axis of the probe. This vane serves primarily to provide a forwardly facing edge 41 which extends radially outwardly far enough to span the rear edge of the drogue 1, and to intercept that edge, as it is shown doing in Figure 3, before retraction of the probe member 32 is complete. Continued or further retraction of the probe member 32 will positively break the connection between the seat 30 and the drogue 1. Since the drogue will not balance on the edge 41, the relative airstream will push the drogue aside, and all connections between the receiving and the tanker airplanes are thus broken. The fully retracted position of the probe member 32 is shown in dash lines in Figure 3.

Since the member 4 is in the form of a narrow vane, it does not appreciably obscure the vision of the pilot in the airplane 2, and since it is of slight area, it has no appreciable effect as a surface upon the flight or control of the airplane. It can be streamlined to whatever extent is desired, and if it is desirable it can also be made retractable, so that when not required it can be completely out of the airstream. A retractable form is shown in Figure 4, wherein two or more, but preferably only two, bars 40 are pivotally mounted at 42 at their forward ends, and upon the forward tip of the fixed probe element 31, and are movable from a retracted position wherein they are flush with the exterior of probe element 31, to the extended position shown in full lines. A brace 43 between each bar 40 and a push-pull rod 44 within the probe element 31, or any suitable actuating means, serves to hold the bars 40 extended, or alternatively to retract them. It is even possible, with such an arrangement, though not preferable, to dispense with the slidable probe element 32, and to rely on extension of the bars 40 to unseat the drogue at the finish of the refueling operation.

I claim as my invention:

1. In a receiving aircraft, an elongated rigid probe directed forwardly from the receiving aircraft substantially in the line of flight and terminating in a tip for coupling within a complemental drogue trailing behind a tanker aircraft, means to extend said probe forwardly and to retract it rearwardly with respect to the receiving aircraft whereon it is mounted, stop means fixedly positioned with respect to the receiving aircraft and located adjacent the probe and behind the probe's tip when the probe is in its foremost position, the movement of the probe's tip effected by the extending and retracting means being of such extent as to withhold the probe-coupled drogue from contact with the stop means when the probe is in its foremost position, and to effect contact between the drogue and the stop means, to uncouple the drogue from the probe, before the probe reaches its rearmost position.

2. The combination as defined in claim 1, wherein the stop means is formed as a thin vane disposed in a fore-and-aft plane with respect to the receiving aircraft.

3. The combination as defined in claim 1, wherein the vane is disposed in a plane directed diametrally of the probe, and its forward edge is diametrally disposed, and of a length to engage the rear edge of the drogue during retraction of the probe.

4. The combination as defined in claim 1, including at least two bars pivotally mounted upon the receiving aircraft alongside the probe, to swing alternatively outwardly or rearwardly, means to extend said bars outwardly as the stop means, or to retract them alongside the probe.

References Cited in the file of this patent

UNITED STATES PATENTS

| 2,199,588 | Cobham et al. | May 7, 1940 |
| 2,582,609 | Steele | Jan. 15, 1952 |
| 2,663,523 | Leisy | Dec. 22, 1953 |
| 2,692,103 | Cobham et al. | Oct. 19, 1954 |
| 2,692,104 | Guiver | Oct. 19, 1954 |

FOREIGN PATENTS

| 676,430 | Great Britain | July 30, 1952 |
| 690,186 | Great Britain | Apr. 15, 1953 |

UNITED STATES PATENT OFFICE
CERTIFICATE OF CORRECTION

Patent No. 2,849,200                          August 26, 1958

Robert P. Person

It is hereby certified that error appears in the printed specification of the above numbered patent requiring correction and that the said Letters Patent should read as corrected below.

Column 4, line 19, for the claim reference numeral "1" read -- 2 --.

Signed and sealed this 4th day of November 1958.

(SEAL)

Attest:

KARL H. AXLINE
Attesting Officer

ROBERT C. WATSON
Commissioner of Patents